US012585071B2

(12) United States Patent
Compton et al.

(10) Patent No.:  US 12,585,071 B2
(45) Date of Patent:      Mar. 24, 2026

(54) FIBER OPTIC CABLE ASSEMBLIES WITH IN-LINE TERMINAL ASSEMBLIES AND METHODS OF MAKING AND INSTALLING SAME

(71) Applicant: CORNING RESEARCH & DEVELOPMENT CORPORATION, Corning, NY (US)

(72) Inventors: Brandon Duvall Compton, Newton, NC (US); Cameron Blake Crisp, Newton, NC (US); Brandon O'Brien Norwood, Lincolnton, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 257 days.

(21) Appl. No.: 18/235,002

(22) Filed: Aug. 17, 2023

(65) Prior Publication Data

US 2025/0060538 A1      Feb. 20, 2025

(51) Int. Cl.
G02B 6/38          (2006.01)
G02B 6/44          (2006.01)

(52) U.S. Cl.
CPC ......... G02B 6/3825 (2013.01); G02B 6/3871 (2013.01); G02B 6/3885 (2013.01); G02B 6/3891 (2013.01); G02B 6/4471 (2013.01)

(58) Field of Classification Search
CPC . G02B 6/4431; G02B 6/44715; G02B 6/4475
See application file for complete search history.

(56) References Cited

U.S. PATENT DOCUMENTS

| | | | |
|---|---|---|---|
| 4,744,629 A | 5/1988 | Bertoglio et al. | |
| 7,006,739 B2 | 2/2006 | Elkins et al. | |
| 7,136,555 B2 | 11/2006 | Theuerkorn et al. | |
| 9,069,151 B2 | 6/2015 | Conner | |
| 2002/0064364 A1 | 5/2002 | Battey et al. | |
| 2005/0265672 A1 | 12/2005 | Theuerkorn et al. | |
| 2006/0133759 A1 | 6/2006 | Mullaney et al. | |
| 2006/0153517 A1 | 7/2006 | Reagan et al. | |
| 2006/0233506 A1 | 10/2006 | Noonan et al. | |

(Continued)

FOREIGN PATENT DOCUMENTS

| | | | | |
|---|---|---|---|---|
| CN | 1361878 A | * | 7/2002 | ......... G02B 6/44765 |
| CN | 111123439 A | * | 5/2020 | ........... G02B 6/3825 |

(Continued)

*Primary Examiner* — Chris H Chu
(74) *Attorney, Agent, or Firm* — Adam R. Weeks

(57) ABSTRACT

A fiber optic cable assembly including a fiber optic cable carrying a plurality of optical fibers. A terminal assembly is coupled to the fiber optic cable along a length of the cable and is where a subset of the optical fibers terminate. The terminal assembly includes a fiber optic adapter optically connected to the subset of the optical fibers. The fiber optic adapter is rotatable about an axis of the fiber optic cable between two or more positions. A portion the terminal assembly is axially movable along a length of the fiber optic cable from a locked position in which the fiber optic adapter is not rotatable about the axis to an unlocked position in which the fiber optic adapter is rotatable about the axis. A method of making and installing such a fiber optic cable assembly is also disclosed.

16 Claims, 12 Drawing Sheets

(56) References Cited

U.S. PATENT DOCUMENTS

| | | | |
|---|---|---|---|
| 2006/0269209 A1 | 11/2006 | Mullaney et al. | |
| 2008/0080818 A1 | 4/2008 | Cobb et al. | |
| 2010/0150504 A1* | 6/2010 | Allen | G02B 6/4475 |
| | | | 385/100 |
| 2010/0220961 A1* | 9/2010 | de Jong | G02B 6/38875 |
| | | | 385/77 |
| 2014/0133822 A1* | 5/2014 | de los Santos Campos | |
| | | | G02B 6/44528 |
| | | | 385/137 |
| 2019/0235182 A1* | 8/2019 | Cheng | G02B 6/3825 |
| 2020/0057227 A1* | 2/2020 | Sayres | G02B 6/4459 |
| 2022/0357542 A1 | 11/2022 | Cooke et al. | |
| 2022/0404574 A1 | 12/2022 | Cooke et al. | |

FOREIGN PATENT DOCUMENTS

| | | | | | |
|---|---|---|---|---|---|
| EP | 2989495 B1 * | 6/2019 | ......... H04Q 11/0067 |
| WO | 2020/214762 A1 | 10/2020 | |
| WO | 2021/154572 A1 | 8/2021 | |
| WO | 2021/247709 A1 | 12/2021 | |

* cited by examiner

FIBER OPTIC CABLE ASSEMBLIES WITH IN-LINE TERMINAL ASSEMBLIES AND METHODS OF MAKING AND INSTALLING SAME

TECHNICAL FIELD

This disclosure relates generally to fiber optic cables, and more particularly to a fiber optic cable assembly including a plurality of in-line terminal assemblies arranged along a length of a fiber optic cable, one or more of the terminal assemblies being movable relative to the fiber optic cable. The disclosure also relates to a method of making and installing the fiber optic cable assembly having such terminal assemblies.

BACKGROUND

The large amount of data and other information transmitted over the internet has led businesses and other organizations to develop large scale data centers for organizing, processing, storing and/or disseminating large amounts of data. Data centers contain a wide range of network equipment including, for example, servers, networking switches, routers, storage subsystems, etc. Data centers further include a large amount of cabling and racks to organize and interconnect the network equipment in the data center. Modern data centers may include multi-building campuses having, for example, one primary or main building and auxiliary buildings in close proximity to the main building. All the buildings on the campus are interconnected by a local fiber optic network.

Data center design and cabling-infrastructure architecture are increasingly large and complex. To manage the interconnectivity of a data center, the network equipment within the buildings on the data center campus is often arranged in structured data halls having spaced-apart rows. Each of the rows is, in turn, configured to receive racks or cabinets (e.g., twenty racks or cabinets) which hold the network equipment. In some data center architectures, each of the rows includes a main patch panel (sometimes referred to as an intermediate distribution frame), which may be at a front or head end of the row. Distribution cables with relatively large number of optical fibers (high fiber counts) are routed from a building distribution frame (sometimes referred to as a main distribution frame) to the main patch panels for the different rows of equipment racks. At the patch panels, distribution fiber optic cables with lower fiber counts are connected to the optical fibers of the associated high fiber count distribution cable(s) and routed along the row to connect to the network equipment held in the various racks in the row. To organize the large number of in-row distribution fiber optic cables, each row typically includes a cable tray or basket disposed above the row for supporting the distribution fiber optic cables as they extend along the row. The network equipment in the racks is optically connected to the distribution fiber optic cables by technicians during the construction of the data center.

While current data center design and cabling-infrastructure architecture are satisfactory for the current needs of the industry, the labor, installation time, and costs to achieve the interconnectivity of the data center can be high. For these reasons, manufacturers continually strive to improve the interconnectivity in the data center. For example, one approach to improve optical infrastructure installation efficiency is to pre-engineer infrastructure components. Such components, such as fiber optic cables, may be pre-terminated in a factory with connectors installed, tested, and packaged for fast, easy, and safe installation at a data center. In this way, an installer would unpack the components, pull or route the pre-connectorized fiber optic cable, snap in connectors (e.g., such as at the row main patch panel), and install jumpers to end equipment. This saves a significant amount of time, effort, and costs compared to on-site connectorization and assembly of cables.

By way of example, various pre-engineered cables for row interconnectivity at data centers are disclosed in PCT Patent Publication No. WO2020214762A1 ("the '762 publication"), the disclosure of which is incorporated herein by reference. As disclosed in the '762 publication, a pre-engineered cable may be a high-fiber count cable having a pre-connectorized distribution end for connection to the main patch panel for a row (e.g., at a head end of the row). The fiber optic cable then has a plurality of distributed drop cables (also referred to as "tap cables") that extend from the main cable at drop points ("tap points") along the length of the cable. The drop points along the fiber optic cable are designed to correspond to the rack spacing and configuration in the row. The ends of the drop cables are also pre-connectorized for easy and quick connection to the network equipment in the racks positioned in the row. In this way, the pre-engineered fiber optic cable may be removed from its packaging, routed along the cable tray so that the drop points correspond in location to the racks in the row, connected at the distribution end of the cable to the main patch panel, and connected at the pre-connectorized ends of the drop cables to the respective network equipment in the racks. With such a pre-engineered fiber optic cable, it is estimated that installation time for row interconnectivity may be reduced from several hours to several minutes.

While pre-engineered cables like those in the '762 publication may assist with reducing labor, installation time and costs, the demand for even faster, lower cost installation remains. Furthermore, some problems remain with installation of pre-engineered cables.

SUMMARY

In one aspect of the disclosure, a fiber optic cable assembly includes a fiber optic cable carrying a plurality of optical fibers and at least one terminal assembly coupled to the fiber optic cable at a location along a length of the fiber optic cable. A subset of the plurality of optical fibers carried by the fiber optic cable is terminated at each terminal assembly of the at least one terminal assembly. Moreover, each terminal assembly of the at least one terminal assembly includes at least one fiber optic adapter optically connected to the subset of optical fibers terminated at the respective terminal assembly. The at least one fiber optic adapter is rotatable about an axis of the fiber optic cable from a first circumferential position to a second circumferential position different from the first circumferential position.

In one embodiment, at least a portion of the at least one terminal assembly is axially movable along a length of the fiber optic cable. For example, in one embodiment, the at least a portion of the at least one terminal assembly is axially movable relative to the fiber optic cable from a locked position in which the at least one fiber optic adapter is not rotatable about the axis to an unlocked position in which the at least one fiber optic adapter is rotatable about the axis. In one embodiment, at least a portion of the at least one terminal assembly is biased toward the locked position.

In one embodiment, each terminal assembly of the at least one terminal assembly may include: (i) an adapter manifold that holds the at least one fiber optic adapter; (ii) a tube that is secured on the fiber optic cable; and (iii) a rotational block that is secured to the adapter manifold and is movably received on the tube so as to be both rotatably and axially movable relative to the tube.

In one embodiment, the tube and the rotational block may cooperate to define the locked position in which rotation of the rotational block about the axis of the fiber optic cable is prevented. In one embodiment, the rotational block is axially movable relative to the tube to the unlocked position in which the rotational block is rotatable about the tube. In one embodiment, the rotational block may be axially movable to and from a first stop, the first stop defining the locked position. In one embodiment, the tube may cooperate with the rotational block to define the first stop. In one embodiment, the first stop may have a castellation configuration. In one embodiment, the tube may have a base ring and a plurality of spaced-apart projections that define the first stop. In one embodiment, the rotational block may include a recess defining a plurality of spaced-apart projections, and wherein the projections of the rotational block mesh with the projections of the tube to prevent rotation of the rotational block relative to the tube at the first stop.

In one embodiment, the at least one terminal assembly may define a second stop between the tube and the rotational block, the second stop being spaced apart axially along a length of the tube from the first stop. The rotational block may be axially movable between the first stop and the second stop. The second stop may define the unlocked position. In one embodiment, the terminal assembly may further include a spring, a spring seat, and a C-clip each cooperating with the tube and defining the second stop. The rotational block may be positioned between the spring and the first stop, and the spring may be compressed when the rotational block is moved to the second stop. In one embodiment, the rotational block may have a through-opening that receives the tube therethrough. In one embodiment, the rotational block may cooperate with the tube to prevent rotation of 360° or more.

According to another aspect of the disclosure, there is a method of assembling a fiber optic cable assembly. The method includes providing an access window in a fiber optic cable carrying a plurality of optical fibers. The method further includes positioning a terminal assembly on the fiber optic cable at the access window. The terminal assembly includes at least one fiber optic adapter that is movable relative to the fiber optic cable and optically connected to a subset of optical fibers of the plurality of optical fibers. The at least one fiber optic adapter is rotatable about an axis of the fiber optic cable from a first circumferential position to a second circumferential position different from the first circumferential position.

In one embodiment, positioning the terminal assembly may include inserting a tube onto the fiber optic cable at the access window, and securing the tube on the fiber optic cable. The at least one fiber optic adapter may be rotatable relative to the tube. In one embodiment, positioning the terminal assembly may include inserting a rotational block onto the tube and attaching an adapter manifold to the rotational block. The adapter manifold may include the at least one fiber optic adapter. The rotational block may be rotatable and axially movable relative to the tube.

In one embodiment, after inserting the rotational block onto the tube, positioning the terminal assembly may include inserting a spring onto the tube adjacent the rotational block, inserting a spring seat onto the tube adjacent the spring, and attaching a C-clip onto the tube for stopping axial movement of the spring and spring seat in one direction on the tube. The rotational block may be axially movable to compress the spring against the spring seat and the C-clip.

In one embodiment, after attaching the C-clip, the method may further include assembling a housing to contain each of the adapter manifold, the rotational block, the spring, the spring seat, the C-clip, and the tube. Following assembling, each of the housing, the adapter manifold, the rotational block, the spring, the spring seat, and the C-clip may be movable relative to the tube. In one embodiment, the housing may be rotatable and axially movable relative to the tube.

In one embodiment, the fiber optic cable includes indicia along a length thereof and positioning the terminal assembly on the fiber optic cable may include aligning the terminal assembly at a predetermined distance from the indicia.

In one embodiment, the method may further include providing a second access window in the fiber optic cable. The second access window may be spaced apart from the access window. The method may further include positioning a second terminal assembly on the fiber optic cable at the second access window. The second terminal assembly may include at least one second fiber optic adapter that is movable relative to the fiber optic cable and optically connected to a second subset of optical fibers of the plurality of optical fibers. The at least one second fiber optic adapter may be rotatable about the axis of the fiber optic cable from a first circumferential position to a second circumferential position different from the first position. The method may further includes aligning the second terminal assembly at the predetermined distance from the indicia.

According to another aspect of the disclosure, there is a method of installing a fiber optic cable assembly disclosed herein. The at least one terminal assembly comprises a plurality of terminal assemblies. The method includes placing the fiber optic cable assembly on a surface with the fiber optic cable extended to a length with the plurality of terminal assemblies spaced apart between a first end of the fiber optic cable assembly and a second end of the fiber optic cable assembly along the length. The method further includes moving a portion of one of the terminal assemblies relative to the fiber optic cable and parallel to an axis of the fiber optic cable to an unlocked position. While at the unlocked position, the method includes rotating at least the at least one adapter of the terminal assembly from the first circumferential position relative to the axis to a second circumferential position relative to the axis to reposition the at least one fiber optic adapter relative to the fiber optic cable.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
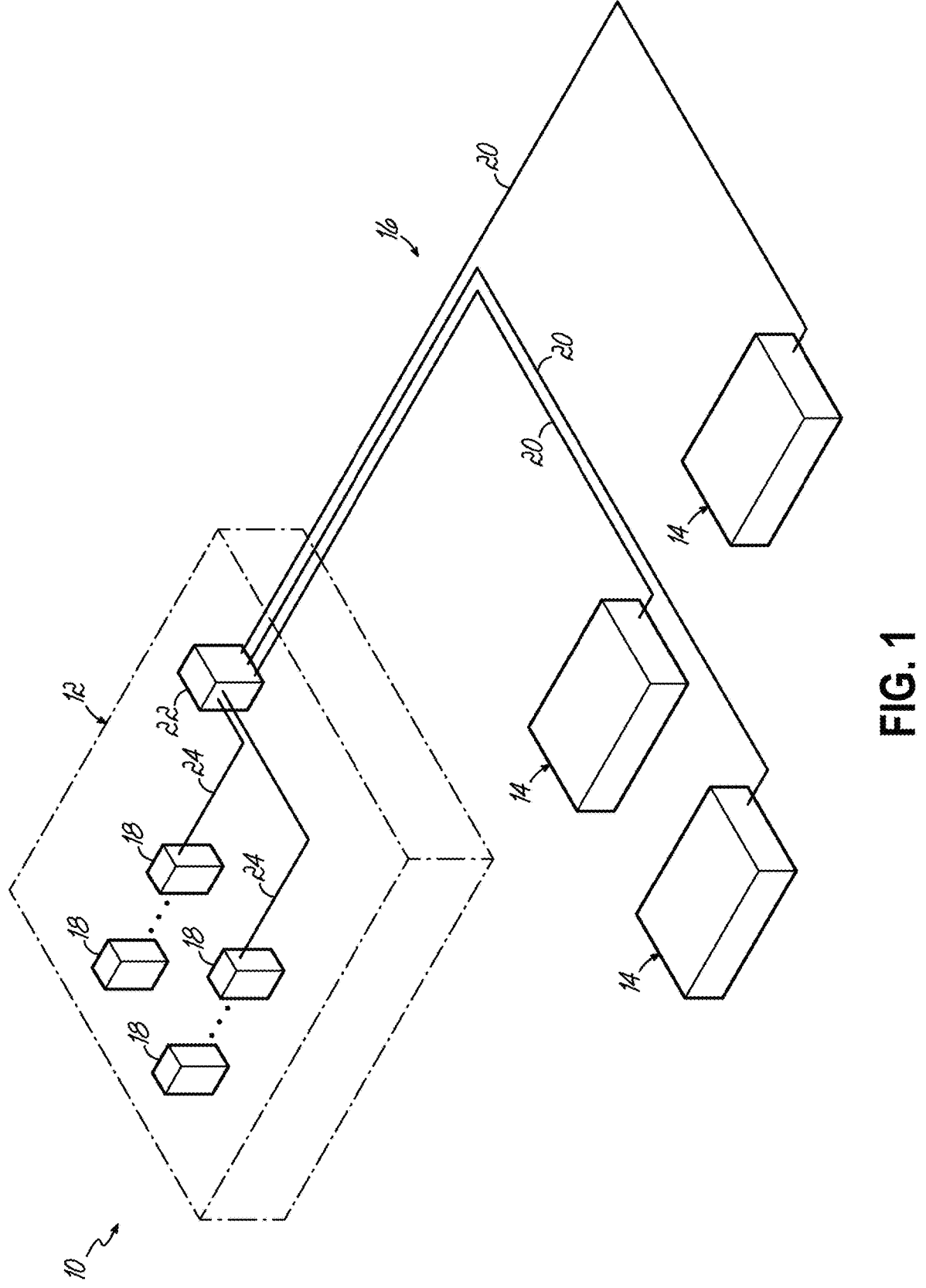
FIG. 1 is a schematic illustration of a data center campus according to an exemplary embodiment of the disclosure.

Various embodiments will be further clarified by examples in the description below. In general, the description relates to a fiber optic cable assembly including a fiber optic cable and a plurality of terminal assemblies spaced along a length of the cable. The terminal assemblies are configured to be in-line with the fiber optic cable, such as generally being disposed about the fiber optic cable. A spacing between the terminal assemblies along the length of the cable generally corresponds with the spacing between racks in a row in a data hall of a data center such that when the fiber optic cable assembly is installed, the terminal assemblies are disposed generally above the racks in the row. A subset of optical fibers carried by the fiber optic cable are terminated and presented for optical connection at each terminal assembly. As an example, the terminal assemblies include at least one adapter for providing a connection to the terminated optical fibers. As delivered from the factory, the fiber optic cable assembly may not provide tether or drop cables extending from the main fiber optic cable. Instead, the terminal assemblies provide an optical interface (e.g., a multi-port adapter) for making optical connections to the network equipment in the racks, such as after the fiber optic cable assembly is installed. A technician may then selectively optically connect additional cables (e.g., drop cables) to one or more of the optical interfaces at one or more of the terminal assemblies. According to embodiments of the disclosure, at least a portion of one or more of the terminal assemblies including the optical interface is movable relative to the fiber optic cable. For example, the portion of the terminal assemblies may be rotatable relative to the fiber optic cable, in particular about an axis of the cable. By the rotational movement, a technician may change the orientation of the optical interface to a new circumferential position relative to the axis of the fiber optic cable. The circumferential position of the optical interface on the fiber optic cable may be defined by a plurality of predetermined angular increments, any single one of which may be selected by the technician. In some embodiments, the terminal assembly includes a locked position at which unintentional rotational movement is not possible and an unlocked position in which a technician may rotate a portion of the terminal assembly relative to the cable. In one embodiment, a portion of the terminal assembly is movable relative to the fiber optic cable in an axial direction between the locked position and the unlocked position and prior to relative rotation of at least a portion of the terminal assembly. According to the embodiments, the orientation of the optical interface relative to the fiber optic cable may be modified at any time. Advantageously, reorientation of the optical interface relative to the fiber optic cable is possible, for example, after manufacturing of the fiber optic cable assembly and after installation of that assembly in a data center. The various features of the fiber optic cable assembly, as described more fully below, provide further reductions in installation time, labor, and costs for data center construction.

As illustrated in FIG. 1, a modern-day data center 10 may include a collection of buildings (referred to as a data center campus) having, for example, a main building 12 and one or more auxiliary buildings 14 in proximity to the main building 12. While three auxiliary buildings are shown, there may be more or fewer buildings depending on the size of the campus. The data center 10 provides for a local fiber optic network 16 that interconnects the auxiliary buildings 14 with the main building 12. The local fiber optic network 16 allows network equipment 18 in the main building 12 to communicate with various network equipment (not shown) in the auxiliary buildings 14. In the exemplary embodiment shown, the local fiber optic network 16 includes trunk cables 20 extending between the main building 12 and each of the auxiliary buildings 14. Conventional trunk cables 20 generally include a high fiber-count arrangement of optical fibers for passing data and other information through the local fiber optic network 16. In the example illustrated in FIG. 1, the trunk cables 20 from the auxiliary buildings 14 are routed to one or more distribution cabinets 22 housed in the main building 12 (one shown).

Within the main building 12, a plurality of indoor fiber optic cables 24 ("indoor cables 24") are routed between the network equipment 18 and the one or more distribution cabinets 22. The indoor cables 24 generally include a high fiber-count arrangement of optical fibers for passing data and other information from the distribution cabinets 22 to the network equipment 18. Although only the interior of the main building 12 is schematically shown in FIG. 1 and discussed above, each of the auxiliary buildings 14 may house similar equipment for similar purposes. Thus, although not shown, each of the trunk cables 20 may be routed to one or more distribution cabinets 22 in one of the auxiliary buildings 14 in a manner similar to that described above. Furthermore, each of the auxiliary buildings 14 may include indoor cables 24 that extend between network equipment 18 and the one or more distribution cabinets 22 of the auxiliary building 14.

Figure 2:
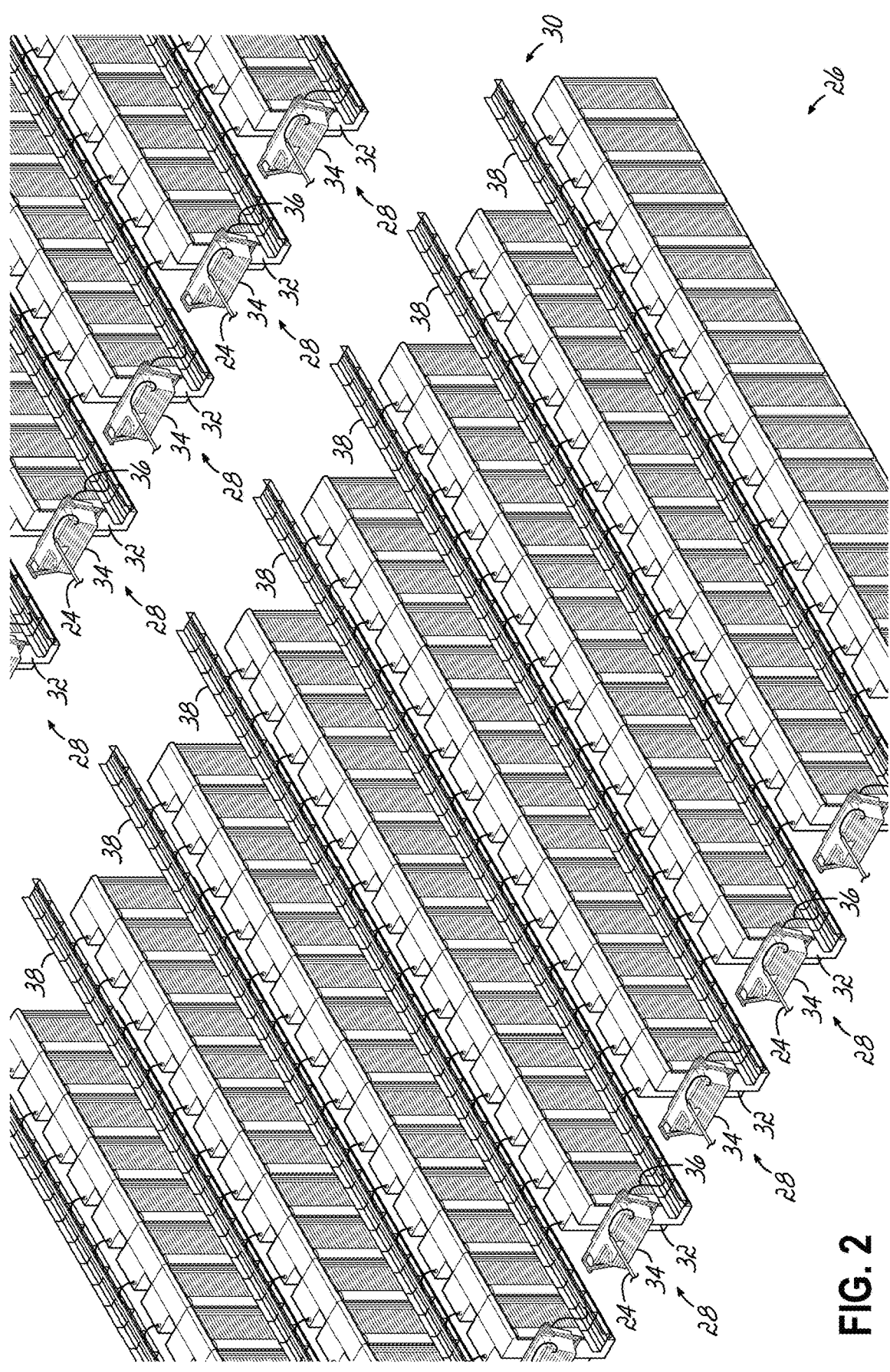
FIG. 2 is a partial perspective view of an exemplary data hall of the data center shown in FIG. 1 according to one embodiment.
Figure 3:
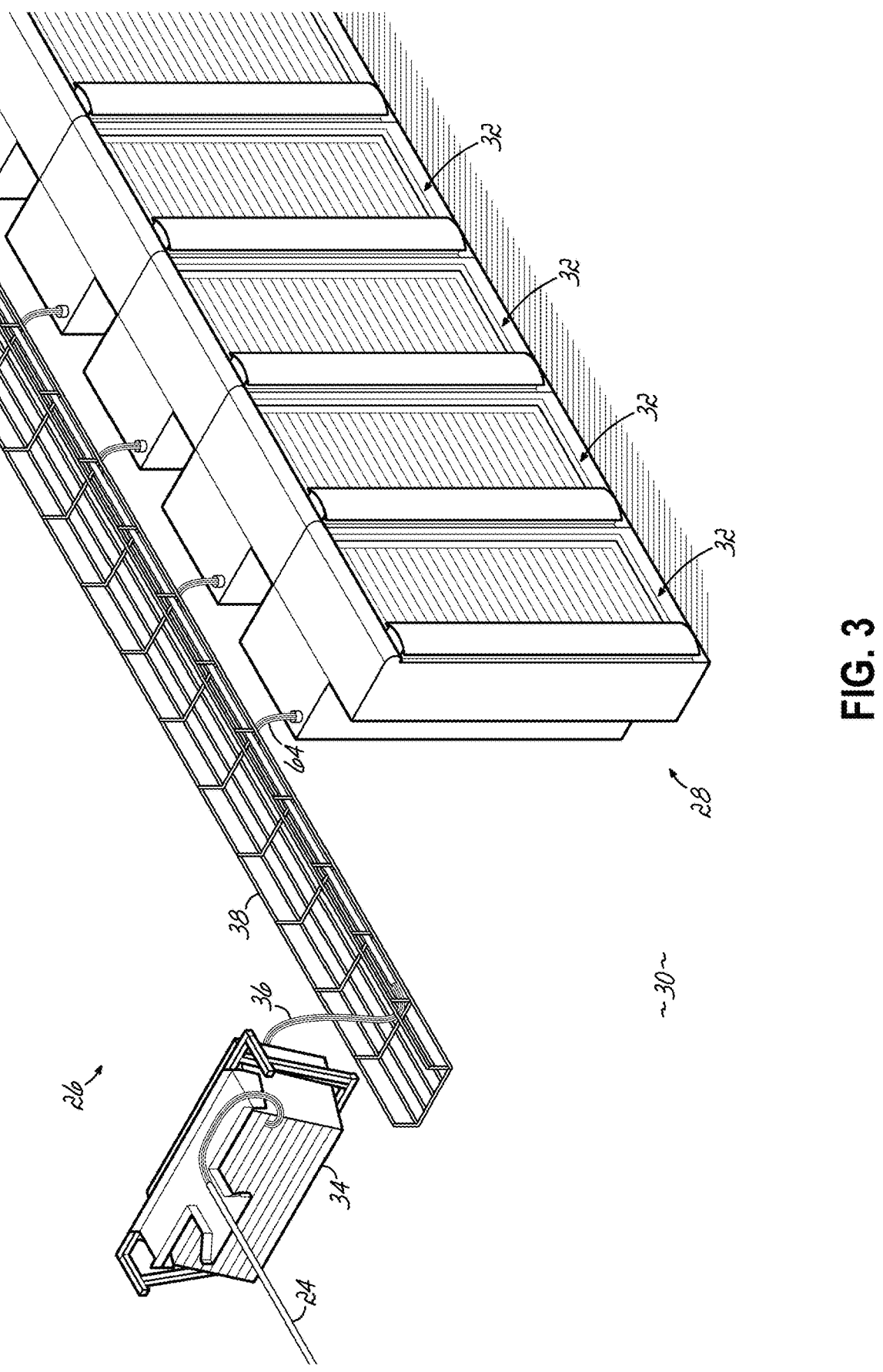
FIG. 3 is an enlarged view of the data hall shown in FIG. 2 according to one embodiment.

As illustrated in more detail in FIGS. 2 and 3, the network equipment 18 in the main building 12 or an auxiliary building 14 may be arranged in one or more data halls 26 that generally include a plurality of spaced-apart rows 28 on one or both sides of an access pathway 30. The arrangement of the data halls 26 into rows 28 helps organize the large number of equipment, fiber optic cables, fiber optic connections, etc. Each of the rows 28 includes a plurality of racks 32 generally arranged one next to the other along the row 28. Each of the racks 32 are vertically arranged frames for holding various network equipment 18 of the data center 10, as is generally known in the fiber optics industry.

In one common arrangement, and as further illustrated in FIG. 2, each row 28 may include a patch panel 34 at the front or head end of the row 28 closest to the access pathway 30. The patch panel 34 represents a termination point of at least some of the optical fibers carried by one or more of the indoor cables 24, for example. One or more fiber optic cable assemblies 36 are connected to the patch panel 34 of a row 28 and routed along a cable tray 38 generally disposed above the row 28. The network equipment 18 in the racks 32 is then optically connected to the one or more fiber optic cable assemblies 36 to provide the interconnectivity of the network equipment 18 of the data center 10.

Figure 4:
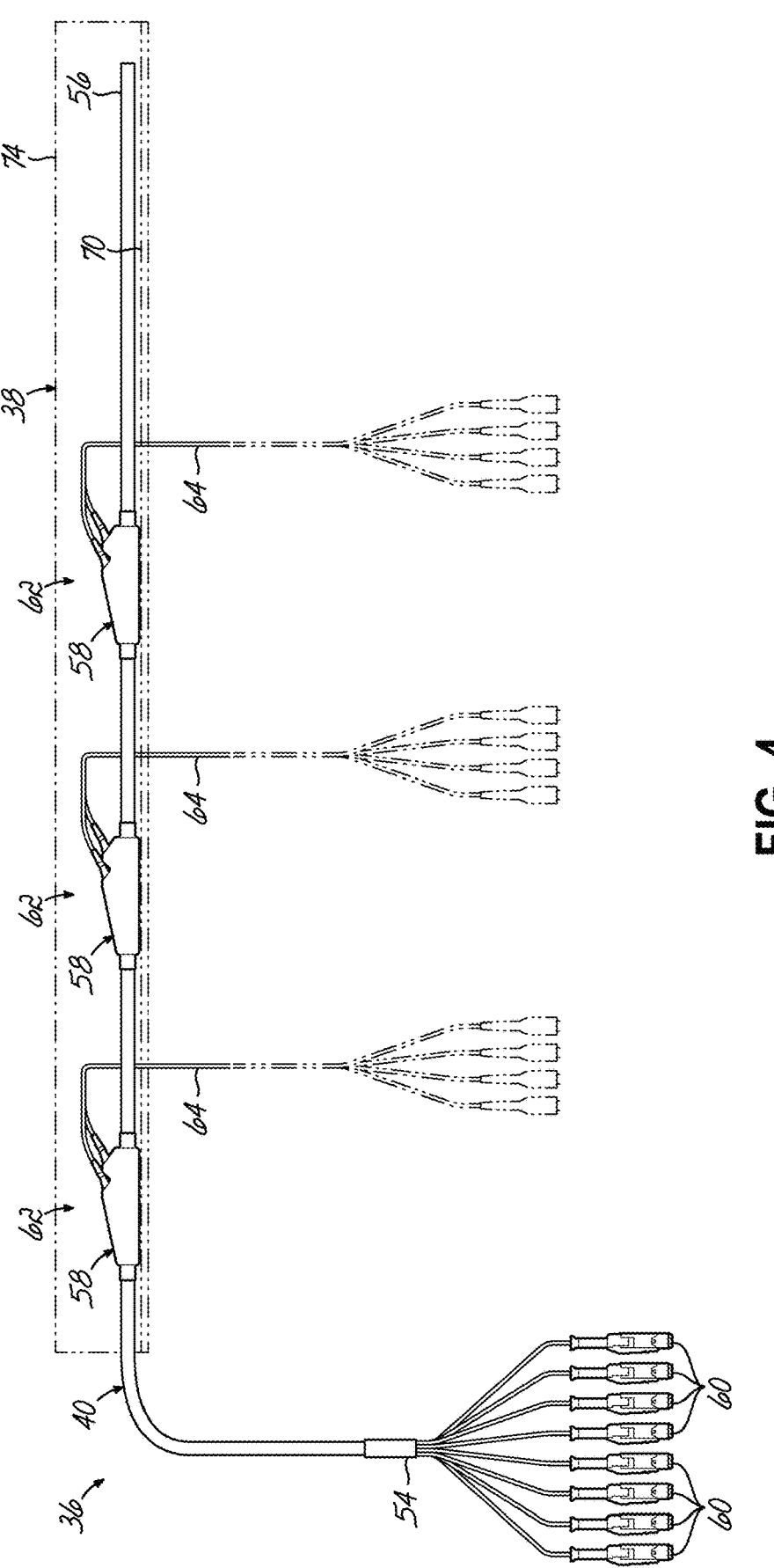
FIG. 4 is a schematic view of a fiber optic cable assembly in accordance with an embodiment of the disclosure.

Aspects of the present disclosure are directed to a fiber optic cable assembly 36 configured to be connected to the patch panel 34 of a row and routed along the cable tray 38 or other cable support of the row 28 for connection to the network equipment 18 in the racks 32. FIGS. 3 and 4 illustrate an exemplary fiber optic cable assembly 36 in accordance with embodiments of the disclosure. Although the fiber optic cable assembly 36 will be discussed in more detail below in the context of an assembly connected between the patch panel 34 at the head end of a row 28 and the network equipment 18 in the racks 32 of the row 28, embodiments of the fiber optic cable assembly 36 are not limited to that application. Accordingly, the fiber optic cable assembly 36 may be used in other contexts of a data center, or other contexts of a fiber optic network more generally.

As illustrated in FIG. 4, the fiber optic cable assembly 36 generally includes a fiber optic cable 40 that carries optical fibers for passing data and other information through the local fiber optic network 16 (FIG. 1), and more specifically between the patch panel 34 and the network equipment 18 in a row 28 (FIG. 3). The number of optical fibers carried by the fiber optic cable 40 and how the optical fibers are arranged within the fiber optic cable 40 may vary based on the application. Embodiments of the fiber optic cable assembly 36 are not limited to any particular number of optical fibers or their arrangement in the fiber optic cable 40. Although not shown in FIG. 4, the fiber optic cable 40 may include a plurality of subunits, and each subunit is configured to carry a pre-selected number of optical fibers. By way of example and without limitation, each subunit may be configured to carry 96, 144, or 288 optical fibers. It should be recognized, however, that more or fewer optical fibers may be carried by each of the subunits.

With continued reference to FIG. 4, the fiber optic cable assembly 36 includes the fiber optic cable 40 having a first distribution end 54, a second terminal end 56 opposite the distribution end 54, and a plurality of terminal assemblies 58 disposed along the length of the fiber optic cable 40 between the distribution end 54 and the terminal end 56. The distribution end 54 of the fiber optic cable 40 includes a plurality of connectors 60 that terminate one or more of the optical fibers carried by the cable 40 and is configured to be connected to optical interfaces, such as those associated with the patch panel 34 at the head end of the rows 28 in the data hall 26. Any conventional, or yet to be developed, optical connector or connectorization scheme may be used in accordance with the present disclosure, including, but not limited to simplex or duplex connectors (e.g., LC connectors) and multi-fiber connectors (e.g., MPO connectors). For example, the connectors 60 may include MPO (multi-fiber push on) connectors, which are configured for multi-fiber cables including multiple sub-units of optical fibers (e.g., between four to 24 optical fibers). In other embodiments, the connectors 60 may be a different type of multi-fiber connector, such as an SN-MT connector commercially available from Senko Advanced Components, Inc. or an MMC connector commercially available from US Conec Ltd. As discussed above, the connectors 60 at the distribution end 54 of the fiber optic cable 40 may be pre-connectorized to avoid field assembly of the connectors 60 to the cable 40.

In the exemplary embodiment of FIG. 4, the terminal assemblies 58 of the fiber optic cable assembly 36 are arranged at distribution points or predetermined locations 62 along the length of the fiber optic cable 40. In the embodiment shown, the locations 62 have a spacing pattern along the fiber optic cable 40 that generally corresponds to the spacing between the racks 32 in the row 28 in which the fiber optic cable assembly 36 is being installed. In this way, when the fiber optic cable assembly 36 is installed, such as in the tray 38, the terminal assemblies 58 are generally disposed above predetermined ones of the racks 32 in the row 28. While only three terminal assemblies 58 are shown in FIG. 4, embodiments are not limited to three. As can be appreciated by FIG. 3, for example, there may be many more terminal assemblies 58 spaced apart along cable 40. Further in that regard, for example, the distribution locations 62 may be uniformly spaced along the length of the fiber optic cable 40 and correspond in number to the uniformly spaced racks 32 in the row 28. In an alternative embodiment, however, the distribution locations 62 may be non-uniformly spaced along the length of the fiber optic cable 40 and not correspond in number to non-uniformly spaced racks 32 in the row 28.

Each of the terminal assemblies 58 of the fiber optic cable assembly 36 represents the termination point of a subset of optical fibers being carried by the fiber optic cable 40 and presents an optical interface for making optical connections to the terminated subset of optical fibers. In an exemplary embodiment, the terminal assemblies 58, and the termination of the subset of optical fibers, may be arranged in the immediate vicinity of the fiber optic cable 40. In other words, and in the exemplary embodiment shown, there may be no tethers or drop cables extending away from the terminal assemblies 58 for presenting optical interfaces (e.g., connectors) at some distance, such as at a specified one of the racks 32, from the cable 40 itself. Instead, as is described below, the optical interfaces for accessing the subset of terminated optical fibers are essentially at the fiber optic cable 40 itself. In other words, terminated optical fibers may be housed in the terminal assembly 58. At this distance, which is essentially defined by a dimension of a housing of the terminal assembly 58, the terminal assemblies 58 may be referred to as being in-line with the fiber optic cable 40. Alternatively, one or more drop cables 64 (individual cables 64 shown in phantom line in FIG. 4) may be optically connected at the terminal assemblies 58 at one end in the tray 38 and extend to one of the racks 32 in the row 28 at the other end (see, e.g., FIG. 3). As examples, the drop cables 64 may be optically connected to the terminal assemblies 58 at optical interfaces following installation of the fiber optic cable assembly 36 in the tray 38 or the drop cables 64 may be optically connected to the terminal assemblies 58 prior to installation of the fiber optic cable assembly 36 in the tray 38, such as after manufacturing and prior to shipment from the manufacturer.

Figure 5A:
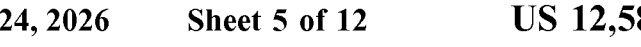
FIG. 5A is an exemplary perspective view of a fiber optic cable assembly depicting misalignment of terminals.

With further reference to installation and FIGS. 4 and 5A, applicant identified a problem with many fiber optic cables—the fiber optic cable may not lay flat on the installation surface, such as on a bottom or a base wall 70 of the tray 38. As a result, the terminal assemblies 58 may be misoriented or misaligned (as shown) relative to one another and may be misaligned relative to each of the sidewalls 72, 74 of the tray 38. Misorientation of the terminal assemblies 58 is generally indicated by individual arrows 66 in FIG. 5A. As shown, the arrows 66 point in different directions rather than generally in a single direction. Misorientation of the terminal assemblies 58 and the inability of the cable 40 to lay flat creates problems during installation. For example, it can be frustrating for the technician who must spend time counteracting misorientation to ensure that terminal assemblies 58 are at the predetermined locations 62 and, further, creates some difficulties requiring additional installation time, for example, with connecting the drop cables 64.

A source of the misalignment is believed to be "deformation memory" in the fiber optic cable, such as the fiber optic cable 40. The deformation memory may appear visually as a twist in the cable 40 that resists gravity after the assembly 36 is placed in the tray 38. That is, after the fiber optic cable 40 is extended to its full length in the tray 38, the fiber optic cable 40 will not lay flat in the tray 38. While the disclosure is not limited to any root cause, the deformation memory in the fiber optic cable is believed to be due to coiling the cable on a spool (not shown) for storage and shipping following manufacturing. At least some of the deformation from being coiled on the spool is retained (i.e., remembered) by the cable 40 following uncoiling and during installation. When the cable 40 is uncoiled from the spool for installation, the cable 40 includes a residual twist or is deformed.

The misalignment of the terminal assemblies 58 observed following installation, such as in the tray 38 shown in FIG. 5A, may occur despite careful alignment of the terminal assemblies 58 during assembly of the fiber optic cable assembly 36 at the factory. For example, the terminal assemblies 58 may be installed on the cable 40 so that the plurality of terminal assemblies 58 is in a single plane and align when the cable 40 is placed on a flat surface. This alignment may be visual alignment of housings of each of the terminal assemblies 58 relative to one another. Once installed, the terminal assemblies 58, for example, the optical interfaces of each, uniformly point in a single direction. Yet, after being coiled and following installation, the terminal assemblies 58 are visually misaligned. See for example, FIG. 5A. As an aid to installation of the terminal assemblies 58 on the cable 40, the cable 40 may include visible indicia 80 along a surface. The indicia 80 provide a visual reference line for installation of the terminal assemblies 58 during assembly of the fiber optic cable assembly 36, for example, at the factory. In that regard, the indicia 80 may be printed text or other measurement markings and may appear continuously at fixed circumferential positions along the length of the cable 40 and/or in predetermined intervals along the length of the cable 40.

Figure 5B:
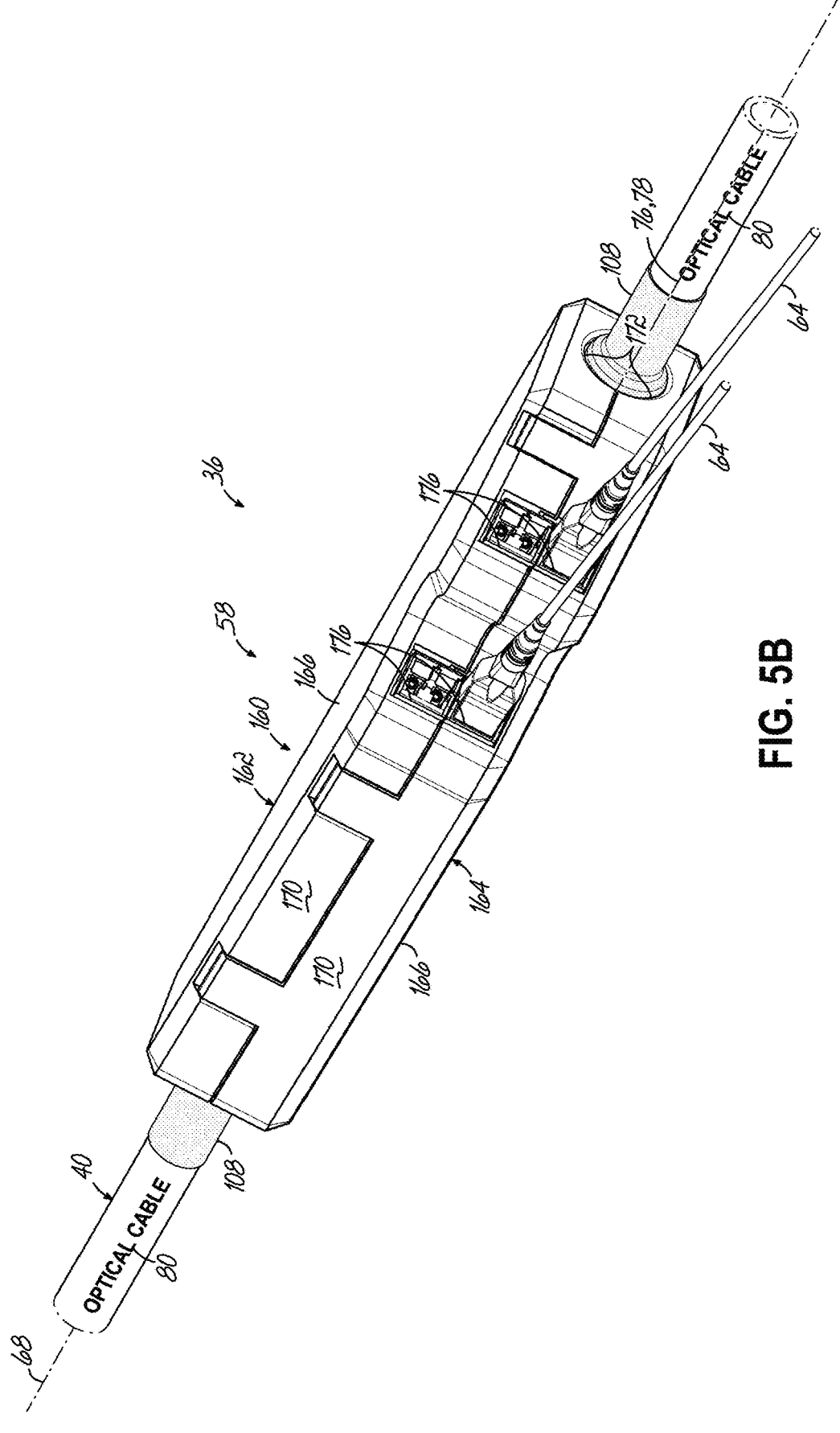
FIG. 5B is an enlarged perspective view of a terminal assembly of a fiber optic cable assembly of FIG. 5A according to an embodiment of the disclosure.

In the exemplary embodiment shown in FIG. 5B, the indicia 80 may be printed in a line 78 that is parallel to an axis 68 of the cable 40. This may be visually apparent as each terminal assembly 58 may be aligned on the indicia 80 or at a fixed predetermined arc measure from the indicia 80 at the factory. In FIG. 5B, a mid-line 76 of the terminal assembly 58 is aligned with the line 78 of the indicia 80. Stated another way, the mid-line 76 coincides with the line 78. However, despite this careful alignment for each terminal assembly 58, misalignment of one or more adjacent terminal assemblies 58 is observed following initial installation. For example, an initial installed position in the tray 38 is shown in FIG. 5A after the fiber optic cable assembly 36 has been coiled for shipment and then uncoiled and laid out in the tray 38.

Advantageously, embodiments of the fiber optic cable assembly 36 address the problems caused by deformation memory that visually manifests itself in the misaligned configuration shown in FIG. 5A. To that end, a portion of each of the terminal assemblies 58 including one or more optical interfaces (shown optically connected with drop cable 64) is movable relative to the cable 40. In the exemplary embodiment and during installation, the technician may rotate the position of the terminal assemblies 58 relative to the cable 40. As an example, this is shown by relative rotation with respect to the indicia 80 in FIG. 6B. By rotation of the terminal assembly 58, the technician accounts for localized, unpredictable twists in the cable 40 that may be present after initial installation. Thus, optical interfaces presented at each assembly 58 may be oriented and reoriented to a more desirable position after the fiber optic cable assembly 36 is placed in the tray 38. As such, the technician may adjust the terminal assemblies 58 from a misaligned orientation (e.g., FIG. 5A) after initial installation of the fiber optic cable assembly 36 to another, different orientation, such as to an aligned orientation (e.g., FIG. 6A) or to another position despite any deformation that the cable 40 retains. By way of example, alignment may be visual alignment with respect to another object, such as another terminal assembly 58 or one or more surfaces of the tray 38. While visual alignment is described, it is contemplated that the alignment may be measured, for example, in degrees, relative to the cable, another terminal assembly or another object.

Figure 6A:
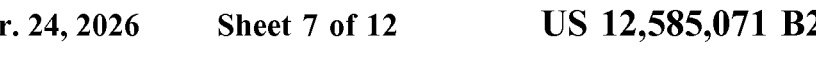
FIG. 6A is an exemplary perspective view of a fiber optic cable assembly depicting alignment of terminal assemblies.

More specifically, as an example only and with reference to FIG. 5A relative to FIG. 6A, the technician may reorient each terminal assembly 58 relative to the cable 40 to align the terminal assembly 58 with a portion of the tray 38 (e.g., the sidewall 74) or to align the terminal assembly 58 with other terminal assemblies 58 in the assembly 36 or to both align the terminal assembly 58 with other terminal assemblies 58 and with a portion of the tray 38, as shown in FIG. 6A. From a different perspective, alignment according to any case may include misalignment of any two terminal assemblies 58 relative to indicia 80 on the cable 40. That is, during installation, the technician may change the alignment of any single one or all the terminal assemblies 58 from their factory assembled positions. For example, a first terminal assembly 58 and a second, adjacent terminal assembly 58 may each be aligned with indicia 80 at the factory. An example of a factory alignment is shown in FIG. 5B in which the mid-plane 76 is aligned with the axis 78 of the indicia 80. Due to deformation memory, the cable 40 includes an unpredictable twist. After initial installation, the fiber optic cable assembly 36 appears as shown in FIG. 5A with a twist between adjacent terminal assemblies 58. A technician can then rotationally adjust one or both terminal assemblies 58 away from their factory installed orientation. The rotational reorientation of the terminal assemblies 58 counteracts misalignment caused by the twist in the cable 40 between terminal assemblies 58.

Figure 6B:
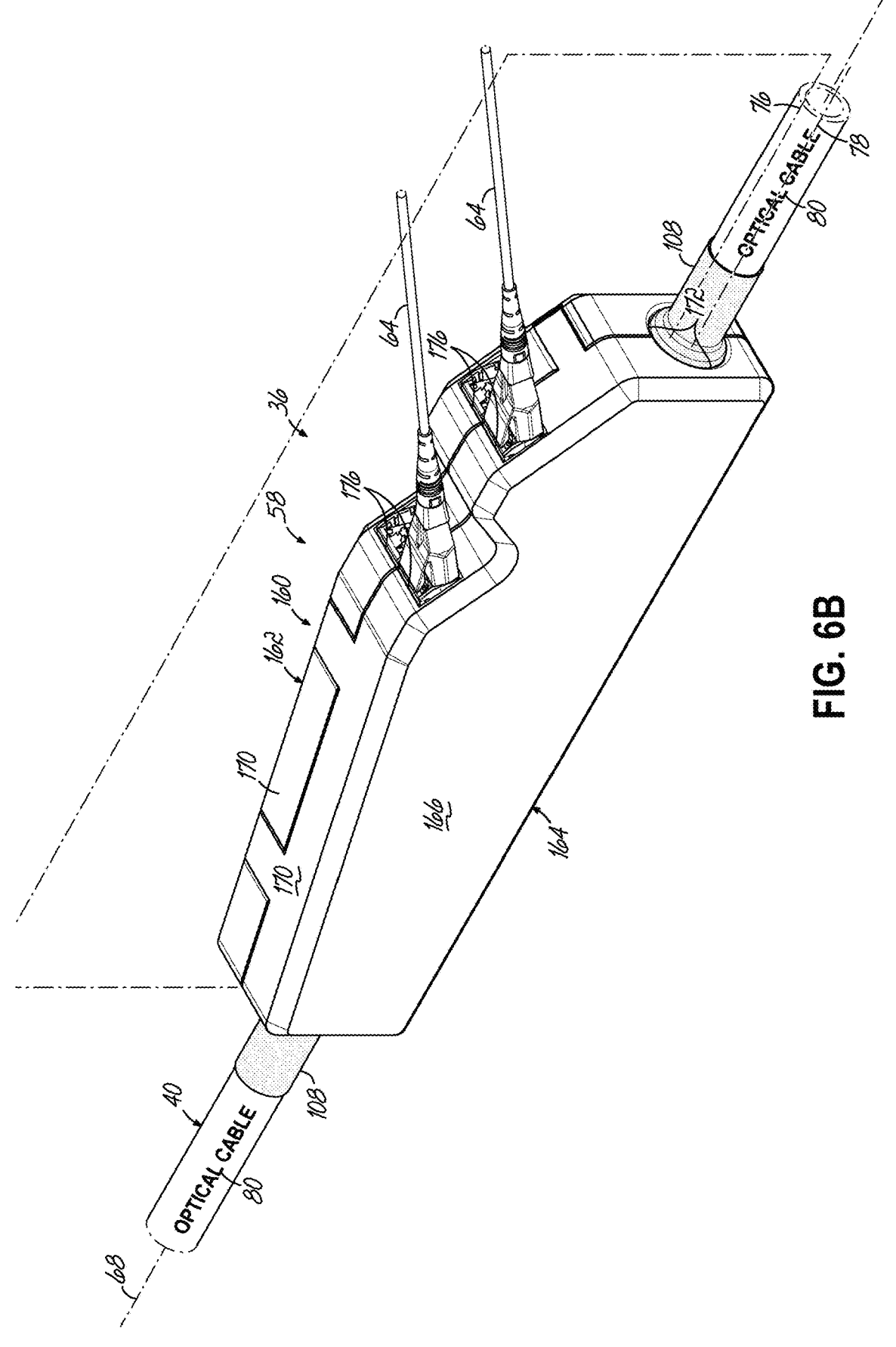
FIG. 6B is an enlarged perspective view of a terminal assembly of a fiber optic cable assembly of FIG. 6A according to an embodiment of the disclosure.

A change in orientation of the terminal assembly 58 on the cable 40 is shown by comparison of FIG. 5B and FIG. 6B.

From the factory installed orientation of FIGS. 5A and 5B, the technician rotates the terminal assembly 58 to a new location relative to the indicia 80. In FIG. 6B, after rotation in the direction indicated by arrow 88, the mid-plane 76 of the terminal assembly 58 is rotated away from the axis 78 of the indicia 80. The terminal assemblies 58 may then be aligned with a predetermined direction relative to one another and relative to the tray 38. Thus, rotating selected ones of the terminal assembly 58 away from their factory installed positions accounts for the variable twist in the cable 40 and may result in the configuration of the fiber optic cable assembly 36 shown in FIG. 6A.

Figure 7:
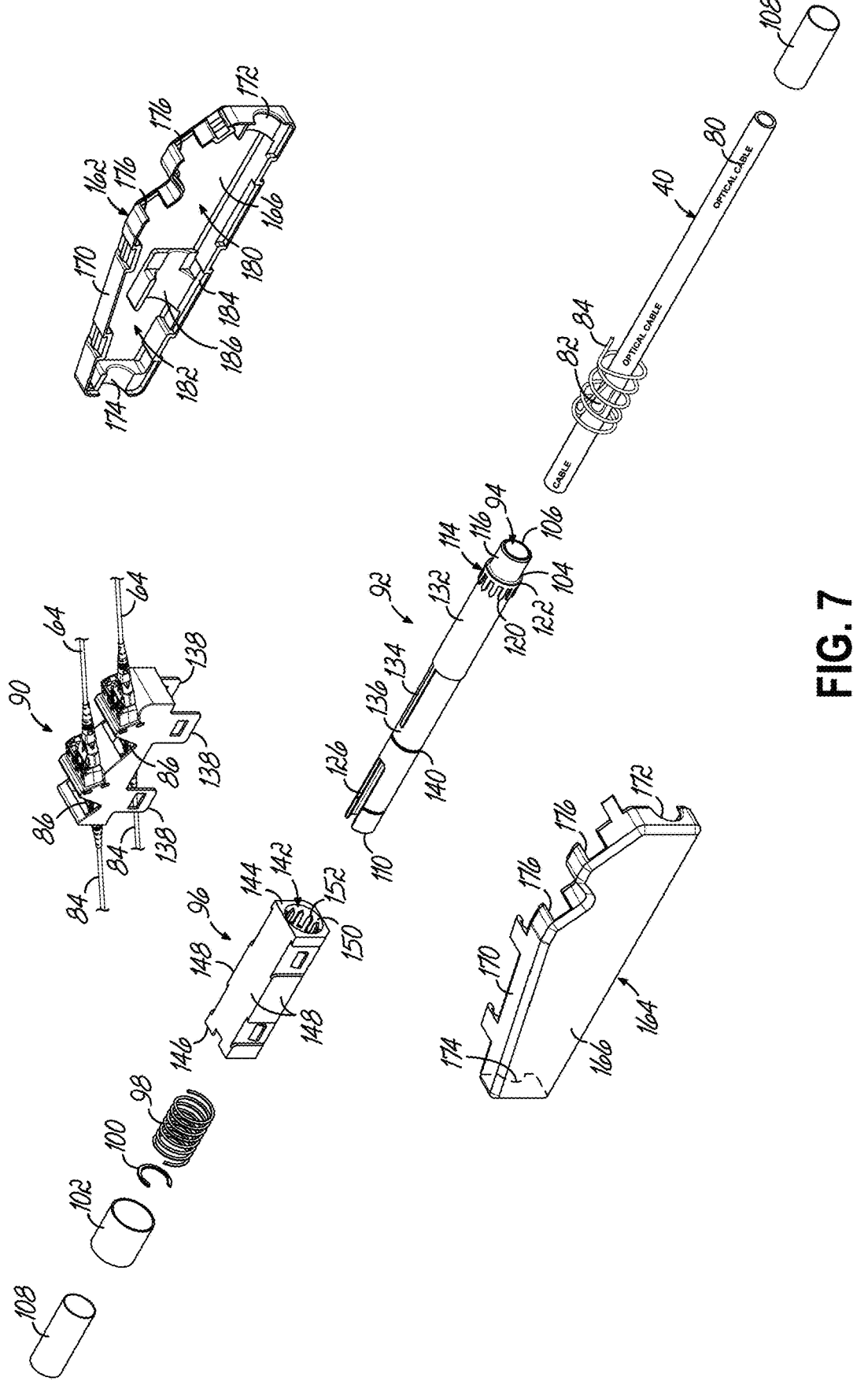
FIG. 7 is a disassembled perspective view of a terminal assembly according to an embodiment of the disclosure.
Figure 8:
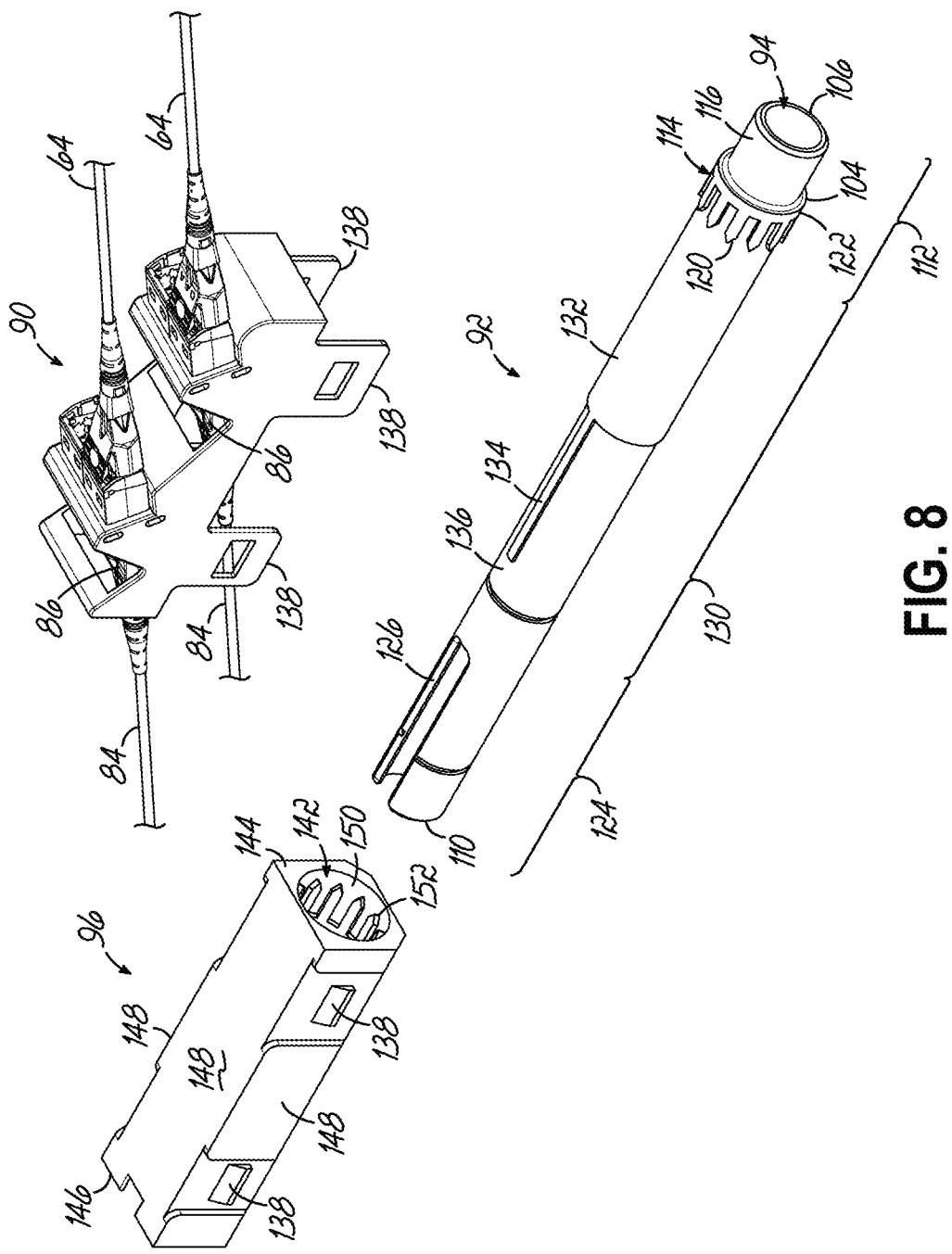
FIG. 8 is a partially assembled perspective view of the terminal assembly of FIG. 7 according to an embodiment of the disclosure.

To those and other ends, in an exemplary embodiment shown in FIGS. 7 and 8, the terminal assembly 58 may be generally disposed about the fiber optic cable 40 such that the cable 40 passes through an interior of the terminal assembly 58. In that regard, the cable 40 includes an access window 82 from which one or more subunits or a furcation leg 84 including optical fibers is extends out of the cable 40 and may be coiled about the cable 40, as shown. The access window 82 may be cut into a sheath of the cable 40 during assembly of the fiber optic cable assembly 36. Access windows 82 may define each location 62 (shown in FIG. 4).

Optical fibers in the furcation leg 84 are terminated at one or more optical interfaces, such as at fiber optic adapters 86. The adapters 86 are secured to an adapter manifold 90 and receive optical connections, such as connections to the drop cables 64 (see also FIG. 4). Exemplary adapters may be designed to connect two optical cables together. In that regard, exemplary adapters may have a single fiber connector (simplex), dual fiber connector (duplex), or multifiber connector and can be configured to receive different types of optical connectors to realize the conversion between different interfaces such as SC, ST, LC, SN, MDC, MPO, SN-MT, and MMC.

Figure 9:
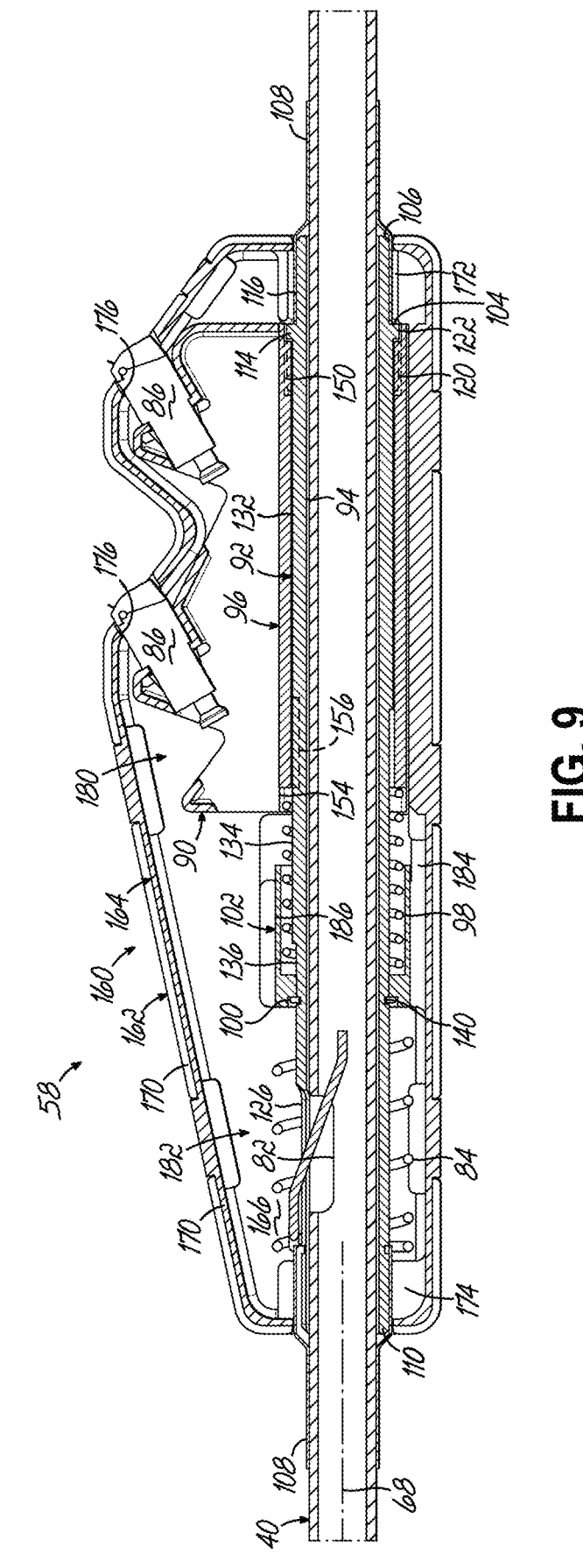
FIG. 9 is a cross sectional view of the terminal assembly of FIG. 5B shown in a locked position relative to the fiber optic cable according to an embodiment of the disclosure.

In the exemplary embodiment, the terminal assembly 58 includes a portion that is fixed to the cable 40 and a portion that is movable relative to the cable 40. With reference to FIGS. 7, 8, and 9, during assembly at the factory, for example, the cable 40 receives a tube 92 along the axis 68 via a longitudinal opening 94 of the tube 92. In the exemplary embodiment, the tube 92 is secured to the cable 40 and so does not move with respect to the cable 40 during reorientation of the optical interfaces, e.g., the adapters 86. In addition, each of a rotational block 96, a spring 98, a C-clip 100, and a spring seat 102 (each described below) is received over the tube 92. Further, in the exemplary embodiment, at least the adapter manifold 90 and the rotational block 92 are movable relative to the tube 92.

Referring to the exemplary embodiment of FIG. 7, the tube 92 may have a variable outside diameter to cooperate and receive the rotational block 96, the spring 98, the C-clip 100, and the spring seat 102, each described below. In the exemplary embodiment, an outside diameter of the tube 92 generally stair steps from a maximum outside diameter at a spaced apart location 104 near an end 106 to a minimum diameter at or near an end 110. Once the tube 92 is received over the cable 40, it may be secured to the cable 40, such as by heat shrink 108 at one or both ends 106, 110 and/or by adhesive. The tube 92 therefore remains stationary with respect to the cable 40 during installation and use of the fiber optic cable assembly 36.

With reference to FIGS. 8 and 9, in the exemplary embodiment shown, the tube 92 includes a first end portion 112 extending from end 106 toward end 110. The first end portion 112 may include a stop 114. The first end portion 112 may also include a sleeve 116 for receiving the heat shrink

108 at end 106 and coupling the tube 92 to the cable 40. In the embodiment shown, the stop 114 provides the greatest outside dimension of the tube 92 at location 104 and is sized to contact the rotational block 96. In particular, the stop 114 is sized to prevent the rotational block 96 from passing over end 106 during assembly of the rotational block 96 on the tube 92 and during use of the fiber optic cable assembly 36. For that reason, the rotational block 96 is received from end 110 of the tube 92 during assembly.

In one embodiment, the stop 114 has a castellation configuration in which a plurality of spaced-apart projections 120 extending toward end 110 from a base ring 122. One or both the projections 120 and the base ring 122 define a maximum outer diameter of the tube 92. As such, the base ring 122 and/or the projections 120 prevent axial movement of the rotational block 96 from end 110 toward and passing over the end 106. While described further below, the projections 120 are spaced apart at predetermined arc length intervals, similar to teeth on a gear, that define fixed circumferential positions for the rotational block 96 relative to the tube 92. The fixed circumferential positions are technician selectable during and following assembly such that the rotational block 96 is selectively positionable around a circumference of the tube 92 via engagement with the projections 120.

The tube 92 further includes a second end portion 124 extending from end 110 toward the end 106. The outer dimension of the second end portion 124 is generally less than the outer dimension of the stop 114. In one embodiment, the outer dimension of the second end portion 124 includes an outer dimension that is at least equal to the smallest outer dimension of the tube 92 and so contributes to a visual stair-step reduction in outer dimension of the tube 92. For example, in FIG. 8, the general stair-step in outer dimension is decreasing from right to left in the figure with the second end portion 124 defining the smallest outer dimension (e.g., smallest outside diameter) of the tube 92.

As shown in FIG. 8, the second end portion 124 includes a slot 126 that opens to the longitudinal opening 94 of the tube 92 and extends to the end 110. When the tube 92 is assembled on the cable 40, the slot 126 is aligned with the access window 82 and the furcation leg 84 extends through the slot 126 and may be coiled around the second end portion 124 of the tube 92. In the exemplary embodiment, the second end portion 124 also receives heat shrink 108 for securing the tube 92 to the cable 40 at the end 110.

In one embodiment, between the end portions 112, 124 of the tube 92, the variable outside dimension of the tube 92 may visually define an intermediate portion 130. The intermediate portion 130 may generally define one or more outer dimensions sized between the maximum outer dimension (e.g., at the stop 114) and a minimum outer dimension, such as near the end 110. For example, the intermediate portion 130 may include a first intermediate dimension defined by a surface 132 extending from the stop 114 toward the end 110. A second intermediate dimension that is less than the first intermediate dimension may be defined by a rotational stop 134 that is generally flush with the surface 132 in a direction toward the end 106 but projects radially outwardly relative to a secondary surface 136. As shown, the rotational stop 134 extends from the surface 132 axially toward the end 110. The rotational stop 134 cooperates with the rotational block 96 in a manner that prevents more than 360° of relative rotation between the tube 92 and the block 96. In that regard, the rotational stop 134 has a predetermined arc measure in a circumferential direction and generally restricts relative rotation of the rotational block 96 about the tube 92 to less than 360°. The restriction in rotation may be determined by an amount including the predetermined arc measure of the stop 134. The tube 92 may further include a circumferential groove 140 as is shown in FIG. 7 that receives the C-clip 100 as is shown in FIG. 8.

With continued reference to the embodiment shown in FIGS. 7, 8, and 9, the rotational block 96 may have a generally rectangular prism configuration having flat sides 148 that form a block-like member. The rotational block 96 is coupled to the adapter manifold 90, such as via engagement of latches 138 on the manifold 90 with cooperating latches 138 on the rotational block 96. In the embodiment shown, the adapter manifold 90 and the rotational block 96 are not movable relative to one another but are instead movable as a single unit relative to the tube 92. In that regard, the rotational block 96 includes a through-opening 142 that opens at opposing ends 144 and 146 for movably receiving the tube 92. In general, the through-opening 142 may have a variable inside dimension to cooperate with the variable outside dimension of the tube 92. For example, an inside dimension of the through-opening 142 may generally stair step from a maximum inside diameter at the end 144 to cooperate with the maximum outside diameter at the stop 114 to a minimum inside diameter at or near an end 146, for example, at a projection 156 (FIG. 9), to cooperate with the dimension established by the rotational stop 134.

With reference to FIGS. 8 and 9, specifically, at end 144 of the rotational block 96, the through-opening 142 includes a recess 150. In the exemplary embodiment, the recess 150 is the largest inside diameter of the through-opening 142. The recess 150 is dimensioned to cooperate with the stop 114 of the tube 92. The rotational block 96 is prevented from sliding over the end 106 by contact between the recessed portion 150 and the stop 114. The recessed portion 150 has a configuration that replicates the configuration of the projections 120 and the base ring 122. In that regard, the recess 150 includes projections 152 that mesh with the projections 120 of the tube 92. The projections 120 and 152 are configured to interlock (i.e., like offset teeth on opposing gears), to prevent rotation of the rotational block 96 relative to the tube 92 by virtue of the tube 92 being secured to the cable 40. This is referred to as a locked position. The projections 120 and 152 may be selectively engaged according to embodiments of the invention to provide a plurality of predetermined rotationally fixed orientations of the rotational block 96 on the tube 92. Thus, there may be many locked positions which may vary from one another with respect to the relative rotational position of the rotational block 96 on the tube 92.

In some embodiments, according to the relative inside dimensions of the rotational block 96 compared to the outside dimensions of the tube 92, the rotational block 96 is movable axially between ends 106 and 110 along the tube 92. At a predetermined relative axial position between the tube 92 and the rotational block 96, the rotational block 96 is rotatable about the tube 92. This is referred to as an unlocked position. Whereas meshing of the projections 152 in the recess 150 with projections 120 on the tube 92 prevents relative rotation at the locked position, disengagement of the projections 120 and 158 permit relative rotation of the block 96 and tube 92. Stated another way, the rotational block 96 is movable toward end 110 and away from contact with the stop 114 to axial positions at which the projections 152 disengage from the projections 120. Once the projections 152 disengage from the projections 120, the rotational block 96 is unlocked and so is rotatable relative to the tube 92. The rotational block 96 can then be moved back toward the end 106 to mesh the projections 152 with the projections 120 at which point the rotational block 96 is prevented from rotation relative to the tube 92. By axial movement of the block 96 relative to the tube 96, the technician is able to unlock the terminal assembly 58 for rotation and then lock the terminal assembly 58 against rotation.

With further regard to that general functionality, in the exemplary embodiment, the spring 98, the C-clip 100, and the spring seat 102 cooperate with the rotational block 96 to maintain the projections 152 of the rotational block 96 meshed with the projections 120 of the rotational block 96. In other words, the spring 98, the C-clip 100, and the spring seat 102 may spontaneously move the rotational block 96 into engagement with the stop 114 by which the projections 120 mesh with the projections 152. The spring 98, the C-clip 100, and the spring seat 102 may operate to maintain the locked position. In that regard, with reference to FIGS. 7 and 8, once the rotational block 96 is received on the tube 92, the spring 98 is assembled on the tube 92. In the exemplary embodiment shown, at end 146, the through-opening 142 widens at the end 146 to form a seat 154 (labeled in FIG. 9) into which the spring 98 may be received during assembly.

Once the spring 98 is assembled on the tube 92, the spring seat 102 is received over the spring 98. As shown, the spring seat 102 is larger in dimension than the rotational block 96. The C-clip 100 is then inserted into the groove 140 in the tube 92 and forms a stop against axial movement of the spring seat 102 toward the end 110. Because the spring seat 102 is dimensionally larger than the rotational block 96, the spring 98, the spring seat 102, and the C-clip 100 cooperate to form a stop against axial movement of the rotational block 96 toward the end 110. In essence, once assembled, the rotational block 96 is captured between two stops—the first stop 114 in one direction and a second stop formed by the spring 98, spring seat 102, and C-clip 100 in the other direction. Embodiments of the invention with a second stop are not limited to the combination of spring 98, spring seat 102, and C-clip 100 shown. As alternatives, the second stop may be provided by a coupling nut or compression fitting threaded on the tube 92 opposite the stop 114 and may be utilized with or without the spring 98 to capture the rotational block 96 against the stop 114.

In the exemplary embodiment, once each of the block 96, the spring 98, the spring seat 102, and the C-clip 100 are assembled on the tube 92, the rotational block 96 is axially movable along a limited predetermined distance defined between the stop 114 near end 106 and the spring 98, the seat 102, and the C-clip 102 toward the end 110. In one embodiment, the limited predetermined distance is at least slightly greater than a distance sufficient for the projections 152 to unmesh with the projections 120. The rotational block 96 is therefore movable axially by a distance sufficient for the projections 152 to clear the projections 120 so that the rotational block 96 can then be rotated relative to the tube 92.

With reference to the exemplary embodiment of FIGS. 6B and 7, the terminal assembly 58 further includes a housing 160 formed of opposing shells 162, 164 that are coupled together. When assembled, the shells 162 and 164 collectively contain each of the adapter manifold 90, the tube 92, the rotational block 96, the spring 98, the C-clip 100, and the spring seat 102 within the housing 160. Each shell 162, 164 includes a base side 166 with a peripheral wall 170 surrounding the base side 166. The peripheral wall 170 defines half-moon shaped channels 172, 174 at opposing sides of the shell 162, 164 and one or more openings 176. Further, each shell 162, 164 includes a main chamber 180 and a secondary chamber 182. The main chamber 180 and the secondary chamber 182 may be separated by a block 184. Each main chamber 180 may be defined by the respective base side 166, the peripheral wall 170 and the block 184 to one side. In the embodiment shown, the block 184 also defines one side of the secondary chamber 182.

When the shells 162, 164 are coupled together, the channels 172, 174 receive the tube 92 and collectively, the main chambers 180 in each shell 162, 164 receive the adapter manifold 90 and the rotational block 96. The rotational block 96 and the manifold 90 are captured between opposing base sides 166, a peripheral wall 170, and the block 184 of the shells 162, 164. The rectangular block-like configuration including sides 148 in cooperation with one or more of the sides 166, the wall 170, and the block 184 prevent the rotational block 96 from rotating relative to the housing 160. In other words, the shells 162 164 are not movable relative to the rotational block 96 or to the manifold 90.

The blocks 184, while separating the chambers 180 and 182, receive one or more of the spring 98, C-clip 100, and spring seat 102 adjacent a channel 186. However, unlike the rotational block 96 and the manifold 90, each of the spring 98, C-clip 100, and spring seat 102 is movable relative to the housing 160. The secondary chamber 182 houses the furcation leg 84 with sufficient slack (i.e., shown coiled around the tube 92) to permit rotation of the block 96 and manifold 90 without placing tension on the furcation leg 84 at its connection with the adapters 86. The secondary chamber 182 therefore provides a storage location for excess length of the furcation leg 84. Once assembled, the housing 160 is movable with respect to the tube 92 along the axis 68, and the housing 160 is also capable of rotational movement about the axis 68 in a predetermined axial position relative to the tube 92, which remains fixed on the cable 40. Further, the adapters 86 are accessible through the openings 176.

In the exemplary embodiment, and with reference to FIGS. 5B and 9, the terminal assembly 58 is shown in a locked position relative to the cable 40. Further in that regard, to unlock the terminal assembly 58 so that a portion of the terminal assembly 58 may be rotated relative to the cable 40, a technician pushes/pulls the housing 160 relative to the cable 40 from the locked position shown in FIGS. 5B and 9 to an unlocked position shown in FIG. 10.

Figure 10:
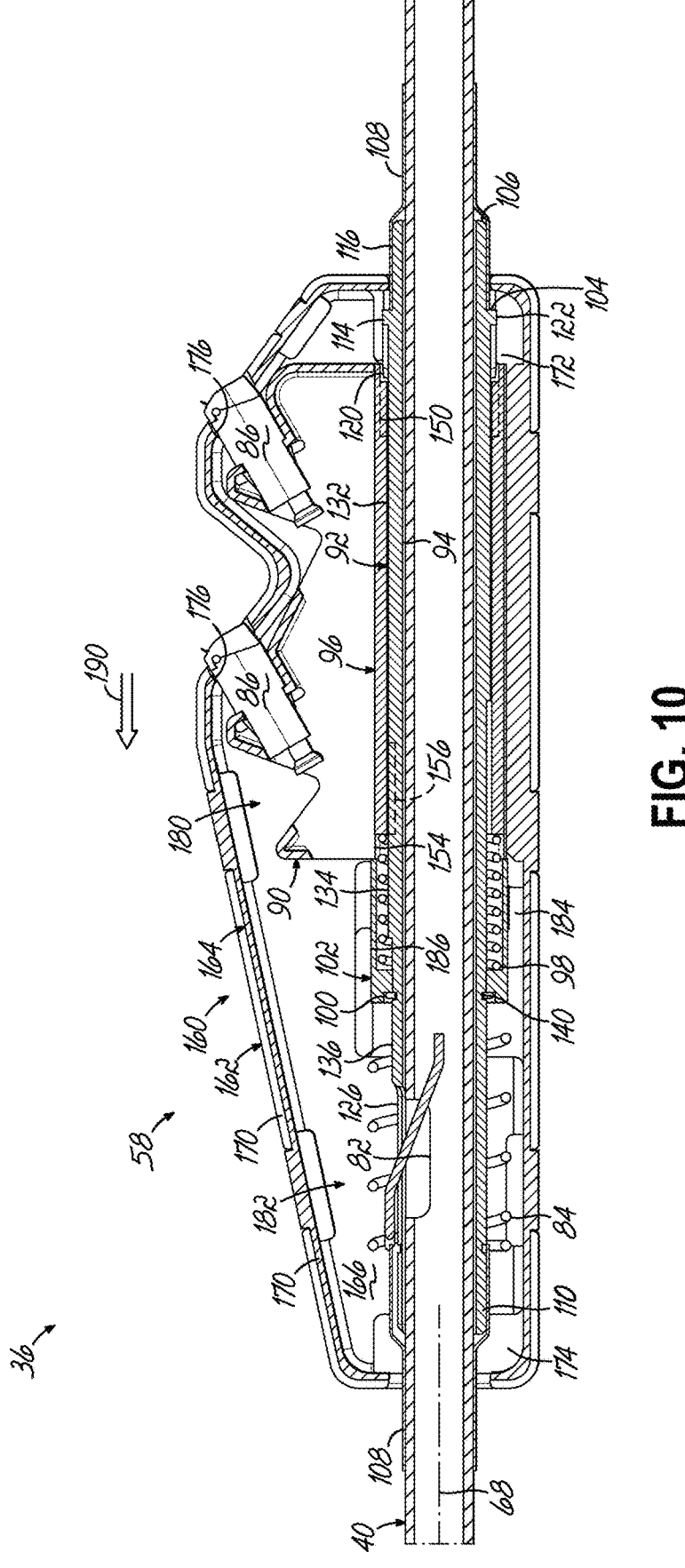
FIG. 10 is a cross sectional view of the terminal assembly of FIG. 6B shown in an unlocked position relative to the fiber optic cable according to an embodiment of the disclosure.

According to pushing or pulling on the housing 160, axial movement to the unlocked position is illustrated by arrow 190 in FIG. 10 in which the housing 160 is moved to the left and parallel to the axis 68 relative to the tube 92 and the cable 40. This is shown, for example, at the left side of the housing 160 at which the channel 174 is displaced to the left relative to the end 110 of the tube 92. That is, the tube 92 and cable 40 are stationary relative to the housing 160. Because the rotational block 96 is captured by the housing 160, pushing the housing 160 to the left (according to arrow 190) from the locked position in FIG. 9 to the unlocked position shown in FIG. 10 also moves the rotational block 96 axially along axis 68 to the left in the figure and toward the end 110 of the tube 92.

As the housing 160 and the rotational block 96 is moved toward the end 110 of the tube 92, the rotational block 96 compresses the spring 98 against the spring seat 102 and against the C-clip 100. Movement of the rotational block 96 axially toward the end 110 also withdraws the projections 152 from being meshed with the projections 120 of the tube 92 proximate the stop 114 at the right side of FIG. 10. At a predetermined axial movement according to arrow 190, the spring 98, the seat 102, and the C-clip 100 stop movement of the housing 160 relative to the cable 40.

Once movement of the housing 160 reaches a location relative to the tube 92 at which the projections 152 of the rotational block 96 clear the projections 120 of the tube 92, the terminal assembly 58 is unlocked and the housing 160 is capable of being rotated relative to the tube 92. This movement may be accompanied by a tactile response by which the technician can be assured that the housing 160 is in a position to rotate relative to the cable 40. Therefore, a minimum movement distance for the rotational block 96 is at least equal to a longitudinal dimension of the projections 152. With this relationship, axial movement of the rotational block 96 relative to the tube 92 of at least equal to the longitudinal dimension is sufficient to unmesh the projections 152 from the projections 120, as shown in FIG. 10.

Once the technician pushes the housing 160 sufficiently to the left in FIG. 10 or away from the end 106 of the tube 92, the projections 152 clear the projections 120. With the projections 120, 152 no longer meshed together, rotational motion of the rotational block 96 relative to the tube 92 is possible. Therefore, when desirable, and while maintaining compression of the spring 98 the rotational block 96 is free to rotate. The technician may then rotate the housing 160 relative to the tube 92. This rotates the rotational block 96 relative to the tube 96 and relative to the cable 40. Rotation of the block 96 reorients the adapters 86 to a new circumferential position relative to the cable 40.

Embodiments of the invention are not limited to any particular rotational direction. In the embodiment shown, the housing 160 is rotated in a direction that is against the coil of the furcation leg 84. Rotation in that direction causes the coil to loosen so that excess length gathers in secondary chamber 82. Therefore, the furcation leg 84 does become wrapped more tightly about the tube 92 and thereby inhibit rotation or place tension at the connection between the furcation leg 84 and the adapter 86.

During rotation, the housing 160 may be rotated by one or more projections 120 on the tube 92 from its initial position (e.g., the factory installed position) to another orientation. In this way, the technician may select a rotational position of the housing 160 relative to the tray 38 and/or the indicia 80 which best repositions the housing 160 and, more particularly, the adapters 86 (i.e., optical interface) to a more desirable orientation. A change in the circumferential position of the housing 160 is shown in FIG. 5B relative to FIG. 6B and described above.

In some embodiments, the new position selected by the technician is from a limited number of fixed positions around the circumference of the cable 40 as determined by the arc measure of the projections 120, 152. By way of example, the arc measure (i.e., circumferential width) of the projections 120, 152 may be about 30° and thus permits indexing of the rotation block 92 relative to the tube 92 at 30° increments. In other words, the position of the housing 160 is not selected from an unlimited number of rotational positions. Rather, the selection is made from a predefined, limited number of fixed circumferential orientations. By way of example and not limitation, the number of fixed positions for the housing 160 relative to the cable 40 may be from 4 to 36 depending on the arc measure of the projections 120 and projections 152. While uniform projections 120 and 152 are shown, that is, each is about the same arc measure, embodiments are not limited to uniform or equal arc measures. Specifically, projections 120 and 152 of unequal arc measures are contemplated. Further, as a limit to the maximum degree of rotation, the rotational stop 134 in combination with the projection 156 may limit the relative rotation of the rotational block 96 to an amount less than 360°. That is, in some embodiments, the rotational block 96 cannot be rotated by 360° about the tube 92. Rather, the maximum rotation may be less the 360°. For example, maximum relative rotation of the rotational block 96 may be from 330° to less than 360°.

Once the technician reaches the desired orientation of the adapter 86 in the housing 160 relative to the cable 40, the technician may release the housing 160. Under the force of the compressed spring 98, the spring 98 may move the rotational block 96 toward the end 106 of the tube 92. This is toward the locked position. By way of example, and without limitation, a spring force of 5 lbs. is believed to be sufficient to spontaneously push the housing 160 to the locked position once the technician releases it. During the spring induced motion, the projections 152 mesh with the projections 120 at the new position of the housing 160. During the movement of the housing 160 axially toward the end 106, there may be slight rotational adjustment to the closest arrangement of the projections 152 mesh with the projections 120. In the exemplary embodiment, the projections 120 and 152 are configured with soft leading edges (e.g., pointed like an arrowhead) to assist in alignment as the projections 120 and 152 reengage. As such, the spring 98 may provide sufficient force to produce both axial and rotational movement of the rotational block 96 as the block 96 moves toward the stop 114 and as the projections 152 reengage with the projections 120.

In the new orientation of the housing, the rotational block 96 is prevented from rotating about the tube 92. In one embodiment, the rotational block 96 may be biased by residual spring force from the spring 98 against the stop 114. In that regard, the terminal assembly 58 may have a normally locked configuration. In other embodiments, there may be some play between the spring 98 and the rotational block 96. That is, the spring 98 may not hold the rotational block 96 against the stop 114 but only engage once the housing 160 is moved axially.

In either embodiment, the orientation of the rotational block 96 is prevented from unintentional rotation due to meshing of the projections 120, 152. While not shown, a technician may reorient one or more of housings 160 relative to the cable 40 at any time, that is, rotation of any single one of the housings 160 is not limited to a single instance as the technician may reorient the housing 160 multiple times. For example, the technician may reorient the housing 160 following installation of the fiber optic cable assembly 36 in the tray 38 and then again following connection of the tap cables 64 at which time the technician may reorient the housing 160 to improve alignment of the tap cables 64 with the tray 38 or with the racks 32.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The disclosure in its broader aspects is therefore not limited to the specific details, representative apparatus and methods and illustrative examples shown and described. Accordingly, departures may be made from such details without departing from the scope of the disclosure.

What is claimed is:

1. A fiber optic cable assembly, comprising:
a fiber optic cable carrying a plurality of optical fibers; and
at least one terminal assembly coupled to the fiber optic cable at a location along a length of the fiber optic cable, wherein a subset of the plurality of optical fibers carried by the fiber optic cable is terminated at each terminal assembly of the at least one terminal assembly, wherein each terminal assembly of the at least one terminal assembly includes at least one fiber optic adapter optically connected to the subset of optical fibers terminated at the respective terminal assembly, the at least one fiber optic adapter being rotatable about an axis of the fiber optic cable from a first circumferential position to a second circumferential position different from the first circumferential position.

2. The fiber optic cable assembly of claim 1, wherein at least a portion of the at least one terminal assembly is axially movable along a length of the fiber optic cable.

3. The fiber optic cable assembly of claim 2, wherein the at least a portion of the at least one terminal assembly is axially movable relative to the fiber optic cable from a locked position in which the at least one fiber optic adapter is not rotatable about the axis to an unlocked position in which the at least one fiber optic adapter is rotatable about the axis.

4. The fiber optic cable assembly of claim 3, wherein the at least a portion of the at least one terminal assembly is biased toward the locked position.

5. The fiber optic cable assembly of claim 1, wherein each terminal assembly of the at least one terminal assembly includes:
(i) an adapter manifold that holds the at least one fiber optic adapter,
(ii) a tube that is secured on the fiber optic cable, and
(iii) a rotational block that is secured to the adapter manifold and is movably received on the tube so as to be both rotatably and axially movable relative to the tube.

6. The fiber optic cable assembly of claim 5, wherein the tube and the rotational block cooperate to define the locked position in which rotation of the rotational block about the axis of the fiber optic cable is prevented.

7. The fiber optic cable assembly of claim 6, wherein the rotational block is axially movable relative to the tube to the unlocked position in which the rotational block is rotatable about the tube.

8. The fiber optic cable assembly of claim 7, wherein the rotational block is axially movable to and from a first stop, the first stop defining the locked position.

9. The fiber optic cable assembly of claim 8, wherein the tube cooperates with the rotational block to define the first stop.

10. The fiber optic cable assembly of claim 8, wherein the first stop has a castellation configuration.

11. The fiber optic cable assembly of claim 8, wherein the tube has a base ring and a plurality of spaced-apart projections that define the first stop.

12. The fiber optic cable assembly of claim 11, wherein the rotational block includes a recess defining a plurality of spaced-apart projections, and wherein the projections of the rotational block mesh with the projections of the tube to prevent rotation of the rotational block relative to the tube at the first stop.

13. The fiber optic cable assembly of claim 8, wherein the at least one terminal assembly defines a second stop between the tube and the rotational block, the second stop being spaced apart axially along a length of the tube from the first stop, wherein the rotational block is axially movable between the first stop and the second stop, and wherein the second stop defines the unlocked position.

14. The fiber optic cable assembly of claim 13, wherein the terminal assembly further includes a spring, a spring seat, and a C-clip each cooperating with the tube and defining the second stop, the rotational block being positioned between the spring and the first stop, and the spring being compressed when the rotational block is moved to the second stop.

15. The fiber optic cable assembly of claim 5, wherein the rotational block has a through-opening that receives the tube therethrough.

16. The fiber optic cable assembly of claim 5, wherein the rotational block cooperates with the tube to prevent rotation of 360° or more.

\* \* \* \* \*